United States Patent [19]

Zimmet

[11] 4,199,251
[45] Apr. 22, 1980

[54] MICRO-FILMING APPARATUS

[75] Inventor: Hans Zimmet, Dresden, German Democratic Rep.

[73] Assignee: VEB Pentacon Dresden Kamera- und Kinowerke, Dresden, German Democratic Rep.

[21] Appl. No.: 9,574

[22] Filed: Feb. 5, 1979

[30] Foreign Application Priority Data

Feb. 7, 1978 [DD] German Democratic Rep. ................................ 0320358

[51] Int. Cl.$^2$ ...................... G03B 27/32; G03B 27/62
[52] U.S. Cl. ......................................... 355/64; 355/75
[58] Field of Search ...................... 355/39, 64, 72–76

[56] References Cited

U.S. PATENT DOCUMENTS

| 1,834,897 | 12/1931 | Caps | 355/75 |
|---|---|---|---|
| 1,946,810 | 2/1934 | Rowell | 355/75 |
| 2,545,964 | 3/1951 | Maxwell | 355/76 |
| 3,186,297 | 6/1965 | Wally | 355/64 X |

Primary Examiner—Donald A. Griffin

Attorney, Agent, or Firm—James C. Wray

[57] ABSTRACT

The micro-filming apparatus comprises an object table, a camera head arranged above said table, a frame pivotally mounted on said table, a glass plate and mounting therefor mounted on said frame, said glass plate being capable of movement perpendicularly of the plane of the frame to adjust the distance between the object and the film, setting sliders mounted on said frame movable between first and second positions, a handle attached to said sliders by which movement between said two positions is effected, and coacting means arranged between said sliders and the plate to effect perpendicular movement of said glass plate on movement of said sliders, wherein on movement of said sliders into the first position the lower surface of the glass plate is brought into the picture-taking plane and on movement into the second position the upper surface of the plate is brought into the picture-taking plane.

In this manner vertical displacement of the camera head or object table is avoided which occasional photographing of single flat sheets of different thicknesses previously demanded.

8 Claims, 7 Drawing Figures

MICRO-FILMING APPARATUS

BACKGROUND OF THE DISCLOSURE

The invention relates to a micro-filming apparatus with camera head and an object table which comprises a carrier surface pivotable glass plate and a lower carrier surface spring-loaded towards the glass plate, while a handle is provided which can be shifted according to choice into a first and a second position and is coupled with a device which varies the distance between film and glass plate, by which device when the handle is set in the first position the lower surface of the glass plate is bringable into the picture-taking plane and when the handle is set into the second position the upper surface of the glass plate is bringable into the picture-taking plane (see D.D.R. Patent Application no. WP G 03b/196 529). USSR 862875).

PRIOR ART STATEMENT

In a known micro-filming apparatus the original to be photographed is pressed under a hinge-down glass plate against a resiliently yielding object table. This manner of holding the original flat in the picture-taking plane is indispensible especially in the case of books. In the case of the occasional photographing of single sheets which in any case are flat, the flat pressing by the hinge-down glass plate by alternate raising and lowering of the glass plate is likewise necessary in order to hold the single sheet correctly in the picture-taking plane by resting against the underside of the lowered glass plate. To avoid the time-consuming opening and closing of the glass plate even when photographing single sheets which in any case are flat, it has already been proposed to make the camera or the object table adjustable so that either the under side or the upper side of the glass plate is situated in the picture-taking plane.

OBJECT OF THE INVENTION

An object of the invention is to avoid the vertical displacement of camera or object table in the case of occasional photographing of single flat sheets.

The object of the invention is the provision of a setting device directly for the glass plate, in order that the upper side or the under side of the latter may be brought according to choice into the picture-taking plane.

SUMMARY OF THE INVENTION

In accordance with the invention this is achieved in that the glass plate is mounted for movement perpendicularly of the plane of the frame in a pivot frame and is bringable according to choice into the said first position or the said second position by setting sliders which are movable parallel with the plane of the frame by means of the handle. The setting sliders are expediently mounted on the two side faces, lying perpendicularly of the axis, of the pivot frame in bolt-slot guides and possess setting cams which are in engagement with setting pegs of the mounting of the glass plate. Preferably it is sought to hold the mounting in the first position in abutment with adjusting screws of the pivot frame with the aid or return springs, and the mounting is raisable into the second position by the setting cams against the return springs of the adjusting screws. According to one advantageous embodiment the pivot frame can be retained firmly in the working position by a catch which can be brought out of engagement with the pivot frame by an electromagnet, and furthermore in the circuit of the electromagnet a switch is provided by which the said circuit is interrupted when the glass plate is in the second position. According to a further feature of the invention the setting sliders comprise further setting cams by which the glass plate is movable into a third position in which the glass plate is situated below the picture-taking plane by the dimension of thick flat originals. The setting sliders are advantageously fixable in every position defined by the setting cams, in relation to the pivot frame, by a detent spring engaging in detent notches.

BRIEF DESCRIPTION OF DRAWINGS

The invention will be explained by way of example with reference to the accompanying drawings in which.

DESCRIPTION OF PREFERRED EMBODIMENTS

Figure 1:
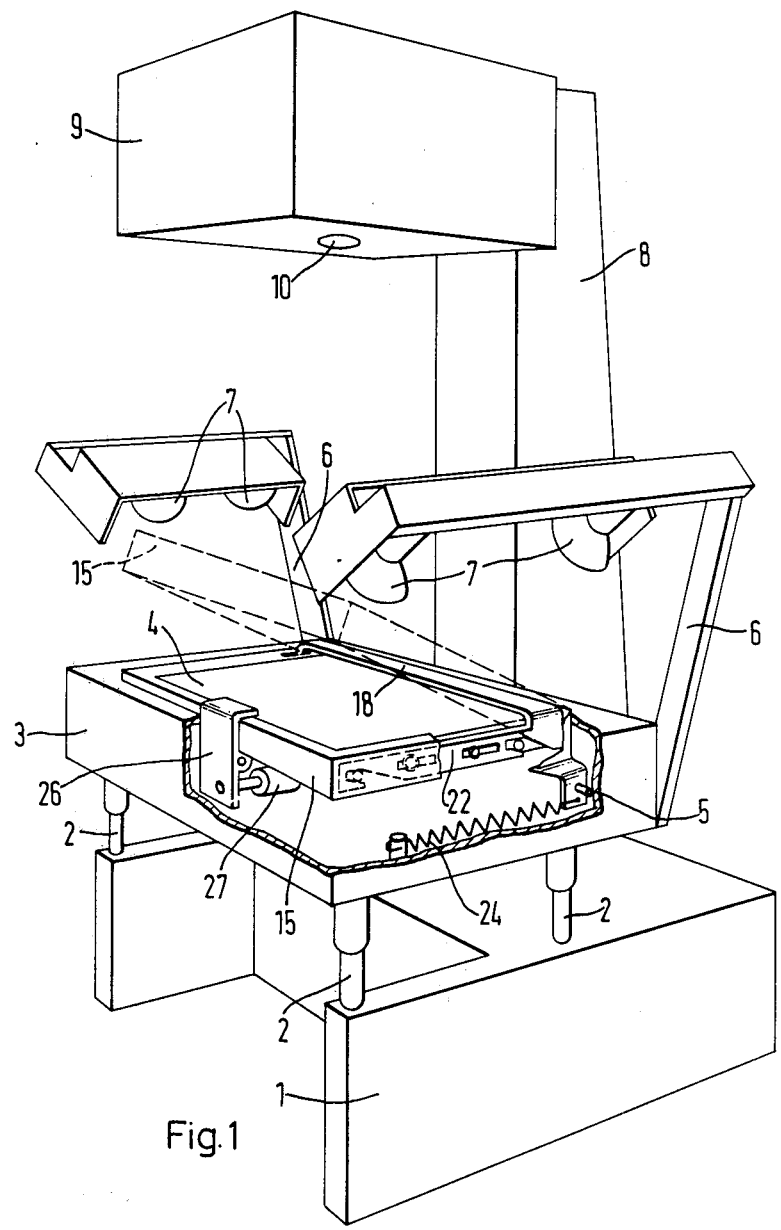
FIG. 1 shows the overall view of the micro-filming apparatus with a pivot frame according to the invention.

In a micro-filming apparatus (see FIG. 1) the object table 3 is mounted by means of columns 2 on the chassis 1. The carriers 6 for the lamps 7 are secured on the object table 3. The pedestal 8 on which the camera head 9 is secured is rigidly connected with the chassis 1. The object lens 10 is directed towards the object table.

Figure 2:
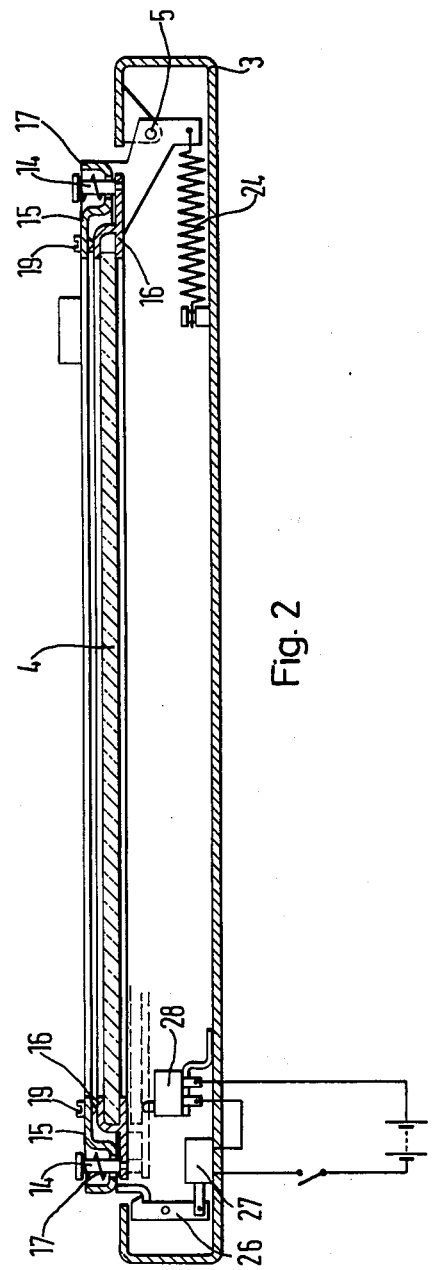
FIG. 2 shows a sectional view of the pivot frame.

The pivot frame 15 is mounted rotatably about the axis 5 in the object table 3 (see FIG. 2). The catch 26 holds the pivot frame 15 against the opening effect of spring 24. The catch 26 can be brought out of engagement with the pivot frame 15 by the electromagnet 27. The circuit for the energisation of the electromagnet 27 can be interrupted by the switch 28. The mounting 16 of the glass plate 4 is guided perpendicularly of the plane of the frame in the pivot frame 15 by means of pegs 14 and return springs 17 seek constantly to hold the mounting 15 of the glass plate 4 in abutment with the adjusting screws 19.

Figure 3:
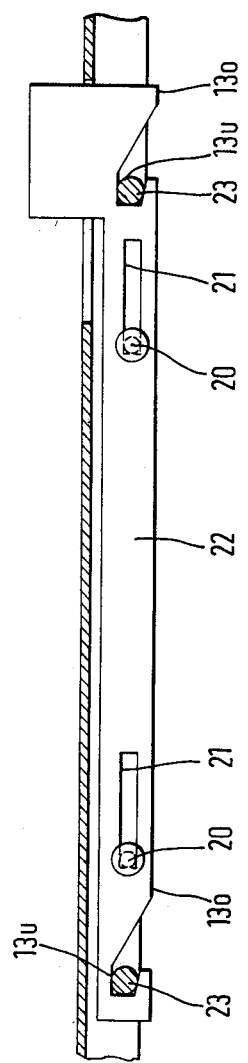
FIG. 3 shows a setting slider in the position u.

On the two side walls of the pivot frame 15 which extend transversely of the axis 5 there are provided bolts 20 which extend into slots 21 of setting sliders 22 (see FIG. 3). The two setting sliders 22 are operable by means of the handle 18. Each of the two setting sliders 22 possesses setting cams 13u and 13o which cooperate with setting pins 23 on the mounting 16 of the glass plate 4 in such a way that the operation of the setting sliders 22 results in the raising or lowering of the mounting 15 together with the glass plate 4.

Figure 5C:
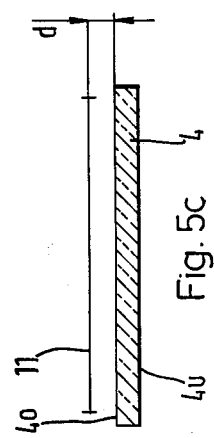
Figure 5B:
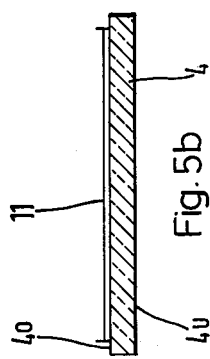
Figure 5A:
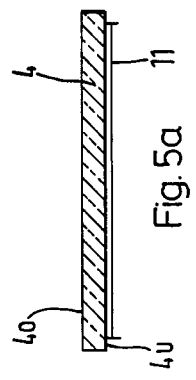

When the setting slider 22 is in the position as shown in FIG. 3 the setting pins 23 are situated opposite to the setting cams 13u, so that the mounting 15 as a result of the return springs 17 presses against the adjusting screws 19 and the lower surface 4u of the glass plate 4 is situated in the picture-taking plane 11 (see FIG. 5a).

In order to locate the upper surface 4o of the glass plate 4 in the picture-taking plane 11 (see FIG. 5b), the setting sliders 22 are moved to the left by means of the handle 18 so that the setting cams 13o through the setting pins 23 move the mounting 15 with the glass plate 4 away from the adjusting screws 19 against the return springs 17. In this position the switch 28 is opened so that hinging up of the pivot frame 15 is precluded. When the switch 28 is closed the release of the catch 26 is possible by closure of the switch 29.

Figure 4:
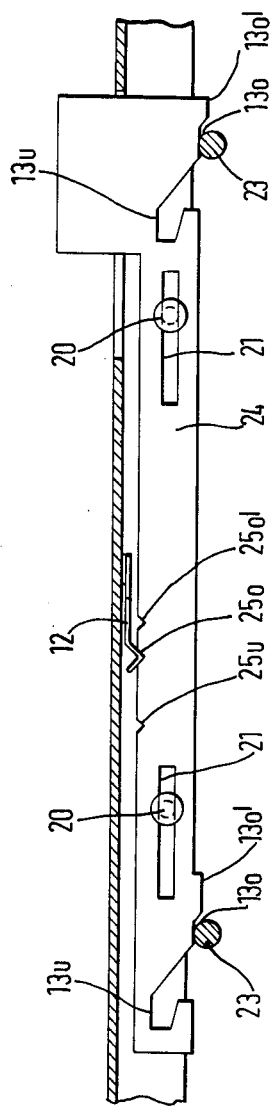
FIG. 4 shows a setting slider in the position o, FIGS. 5a, b, c show positions of the glass plate in relation to the picture-taking plane.

According to the example of embodiment in FIG. 4 the setting sliders 24 comprise further setting cams 13o' by which the glass plate 4 can be brought into the position according to FIG. 5c. This position of the glass plate 4 serves for the laying down of originals which are in any case flat but are thick. In order to fix the setting sliders 24 in the positions corresponding to the setting cams 13u, 13o and 13o', a detent spring 12 is provided which can engage in notches 25u, 25o and 25o' of the setting slider 24.

I claim:
1. A micro-filming apparatus comprising
   (a) an object table,
   (b) a camera head arranged above said table,
   (c) a frame pivotally mounted on said table,
   (d) a glass plate and mounting therefor mounted on said frame, said glass plate being capable of movement perpendicularly of the plane of the frame to adjust the distance between the object and the film,
   (e) setting sliders mounted on said frame movable between first and second positions,
   (f) a handle attached to said sliders by which movement between said two positions is effected, and
   (g) coacting means arranged between said sliders and the plate to effect perpendicular movement of said glass plate on movement of said sliders, wherein on movement of said sliders into the first position the lower surface of the glass plate is brought into the picture-taking plane and on movement into the second position the upper surface of the plate is brought into the picture-taking plane.

2. A micro-filming apparatus according to claim 1, wherein the setting sliders are mounted in bolt-slot guides provided on the two side faces of the pivoted frame which lie perpendicular to the pivotal axis of the frame.

3. A micro-filming apparatus according to claim 1, wherein said coacting means comprise setting cams on said sliders and setting pins on said plate.

4. A micro-filming apparatus according to claim 3, wherein the setting sliders comprise further setting cams by which the glass plate can be moved into a third position in which the plate is situated below the picture-taking plane by a predetermined amount.

5. A micro-filming apparatus according to claim 4, wherein the setting sliders are fixable in each of the positions defined by the setting cams in relation to the pivot frame by a detent spring engaging in detent notches.

6. A micro-filming apparatus according to claim 1, wherein the plate is carried in a mounting and held in the first position in abutment with adjusting screws of the pivoted frame by return springs, said mounting being liftable by the setting cams into the second position against the return springs.

7. A micro-filming apparatus according to claim 6, wherein the pivoted frame can be held fast in the working position by a catch which is movable out of engagement with the pivot frame by an electromagnet.

8. A micro-filming apparatus according to claim 7, wherein a switch is provided in the circuit of the electromagnet by which the said circuit is interrupted when the plate is situated in the second position.

* * * * *